Jan. 15, 1935.  W. B. FAGEOL  1,988,073
TRACKLESS TROLLEY VEHICLE
Filed Oct. 23, 1931  2 Sheets-Sheet 2
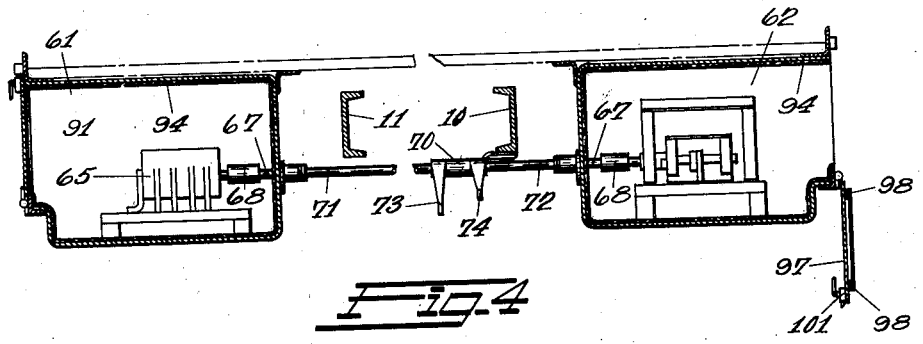
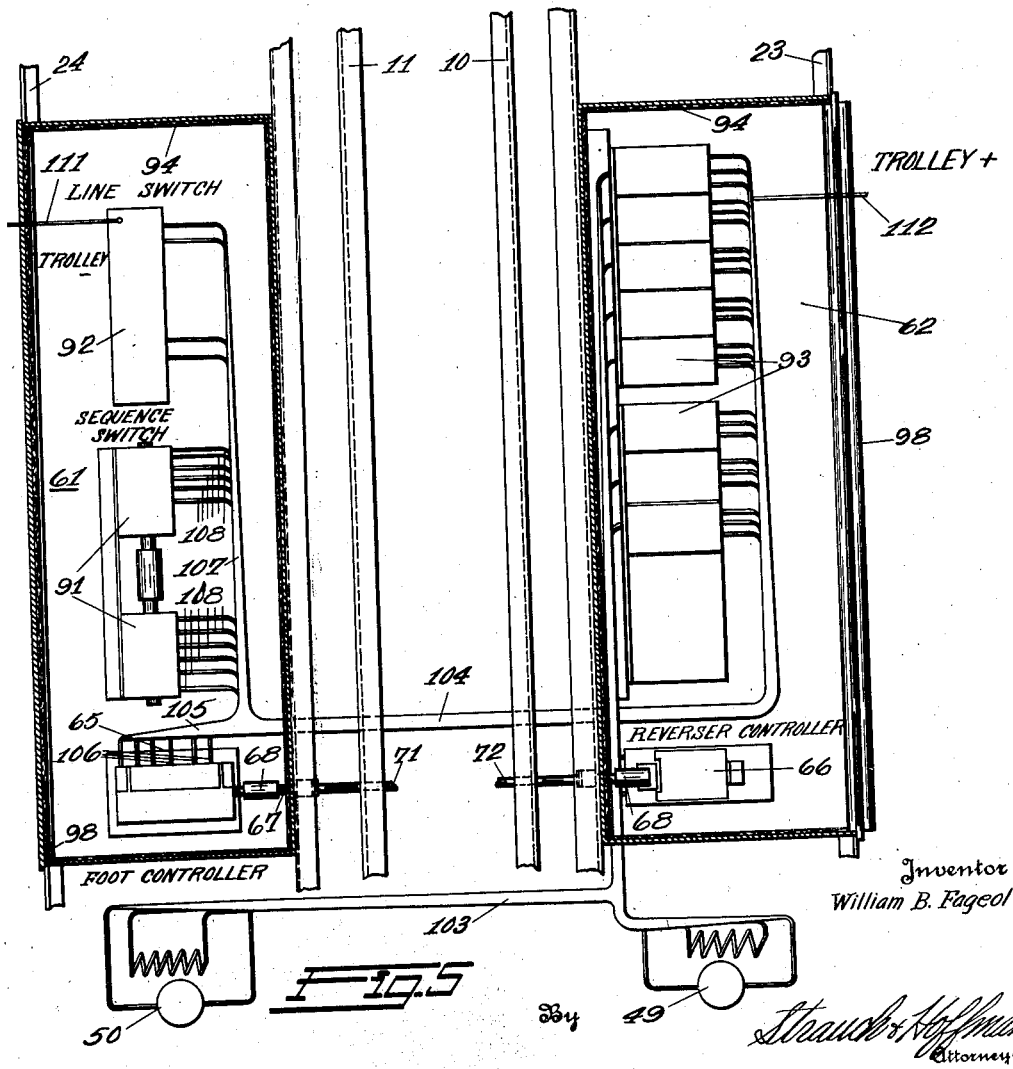
Inventor
William B. Fageol Patented Jan. 15, 1935

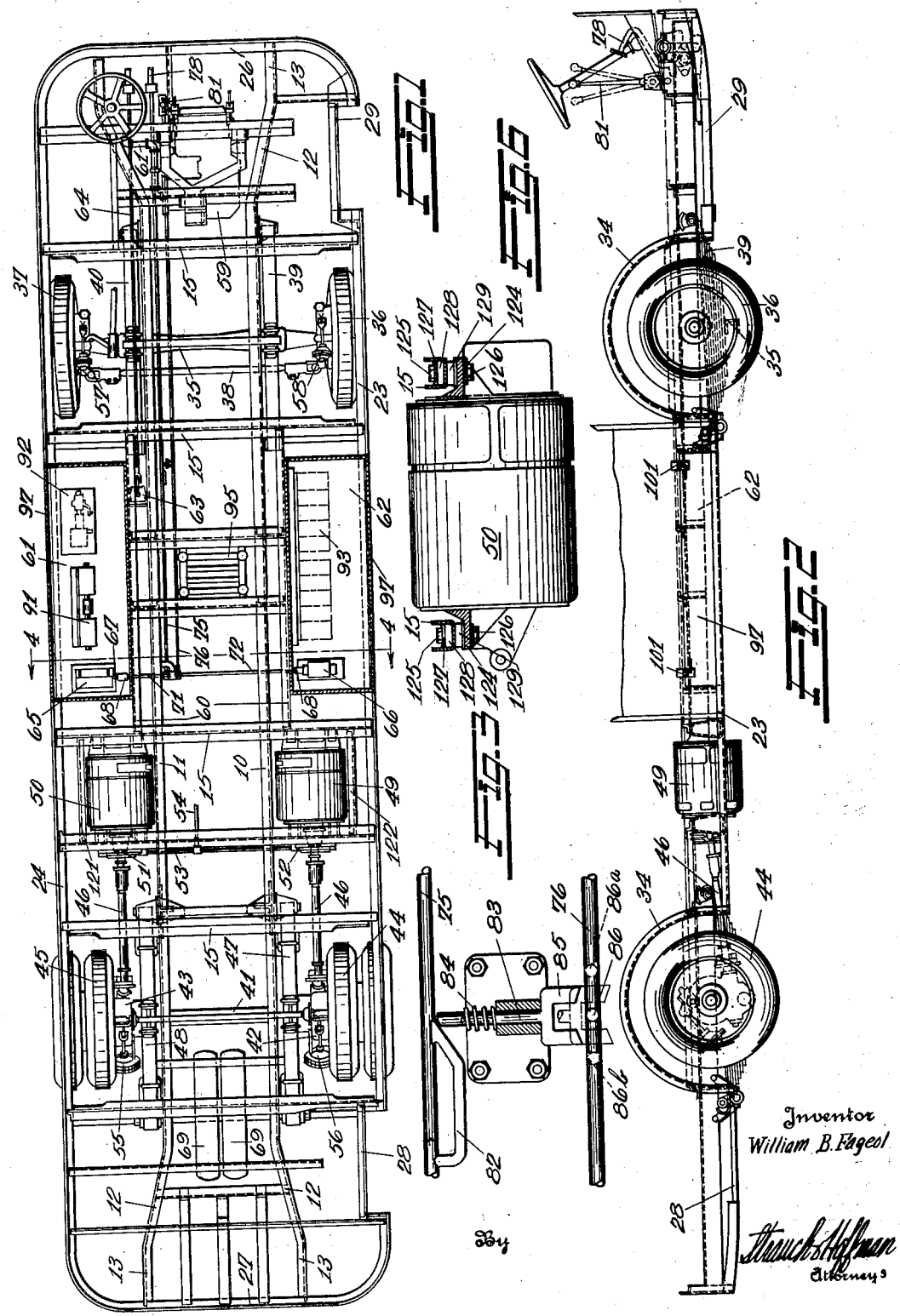

1,988,073

UNITED STATES PATENT OFFICE 1,988,073

TRACKLESS TROLLEY VEHICLE

William B. Fageol, Kent, Ohio, assignor to Twin Coach Company, Kent, Ohio, a corporation of Delaware Application October 23, 1931, Serial No. 570,752

8 Claims. (Cl. 180—2)

The present invention relates to road vehicles of the electrically driven type that carry motors driven from a remote power plant supplying current under relatively high tension to overhead wires from which the vehicle secures electric energy through trolleys in the usual manner.

The present invention is directed to a vehicle known as a trackless trolley or trolley bus in which electric motors and necessary accessory equipment are suspended from the body of the vehicle in such manner as to provide a safe road vehicle having a low floor line that continues at the same level from end to end of the body, to provide maximum riding comfort, and maximum seating arrangement for the passengers.

A trolley bus of the type to which this invention pertains must necessarily be equipped with many electrical controls and many electrically-operated pieces of apparatus. Generally two electric motors are provided for driving the vehicle and the high tension electric current must be safely carried from the trolley to the motors, and a cut-out switch and circuit breaker must be provided for the current. Furthermore, there must be an electrical controller for the motor, and a controller for reversing the rotation thereof, and in addition other miscellaneous electrical apparatus must be provided such as the door operating equipment, stop lights, buzzers, fare box register system, header magnetic valve compressor governors, lighting switches, and other miscellaneous units. On prior installations these electrical units have been scattered throughout the body of the bus on side panels, sometimes in back of and under the seats of the vehicle in order to conserve space, where they have been a hazard to the passengers and have been inaccessible for ready repair and adjustment.

The bodies of such vehicles are substantially all metal, and are mounted on rubber-tired wheels with the result that the danger from stray or leakage electric currents on such busses is serious, since the entire body and chassis is not grounded as in street cars in which the return for the electric current is by way of the metal wheels to the metal rails. With rubber-tired trolley busses a separate trolley return must be provided, and any appreciable leakage of current to the metal body due to accidental grounds through the vehicle body is dangerous to the passengers.

The use of high voltage current on rubber-tired busses has heretofore been hazardous and various expedients have been resorted to in an endeavor to prevent danger from leakage currents to the body of the bus. The tendency has been toward complicating the electrical apparatus in an endeavor to make the arrangement thereof safe for the riding public. The various prior proposed methods of arranging the electrical equipment to make the bus safe from electrical hazards have not proved satisfactory and danger frequently arises due to the leakage of the electrical current into the metallic body of the bus. The prior arrangements of the electrical equipment with proper safety controls involve a considerable amount of special apparatus, part of which is mounted on the roof of the bus and part on the chassis. This equipment is relatively expensive and heavy, thus adding to the initial cost and to the upkeep and operating expense.

One object of this invention therefore is to provide an arrangement for the electrical equipment of a trolley bus, in which the various electrical control units are grouped within cabinets wherein they are effectively insulated from the bus chassis and body and are readily accessible for repairs and adjustments. By the present invention the fire hazard and the hazard of leakage of electrical currents is minimized, the necessary wiring throughout the chassis of the bus is greatly diminished, and cumbersome equipment such as that previously used for eliminating stray leakage currents is eliminated.

Another object of this invention is to provide a trolley bus wherein the use of high tension electric current is made safe by grouping all electrical control equipment within one or more sealed cabinets and providing very short wires from the cabinets to the motors. In this way the danger from electrical leakage and short circuits is practically eliminated and high tension current may be used for all electrical apparatus on the vehicle, thus avoiding the use of batteries and charging equipment therefor, motor-generating sets, and other heavy and expensive voltage-reducing apparatus previously used for safety.

Still another object of this invention is to provide a trolley bus wherein all of the electrical control apparatus is balanced with respect to the longitudinal and transverse axis of the bus to correctly distribute the weight thereof with respect to the vehicle wheels, thus reducing body stresses and adding to the riding comfort of the vehicle.

Past experience has indicated that satisfactory results can be obtained from the electrical apparatus on trolley busses if it is thoroughly shielded from the weather and carefully insulated from the chassis of the vehicle. Providing individual cabinets or shields that cannot be closed tightly around the electric units is unsatisfactory in that it adds to the expense of the construction and renders the parts relatively inaccessible and in many cases the cabinets cannot be tightly closed.

A further object of this invention therefore is to provide two large cabinets, one on each side of the trolley bus, and to group all of the electrical control apparatus in these cabinets, the cabinets being placed beneath the floor line of the vehicle, and the electrical equipment being mounted on relatively inexpensive wood, rubber or like insulating blocks within the cabinets. The use of a separate cabinet for each electrical unit is avoided and the interior of the cabinets is readily accessible through large doors opening through the side of the vehicle, the doors being capable of being sealed to prevent entrance of moisture to the apparatus contained therein.

A still further object of the present invention is to provide a thoroughly safe and reliable yet relatively simple and inexpensive interlocking control apparatus between the forward speed controller and the reversing controller whereby the speed controller for the electric motors must always be brought to off position before the reversing controller may be operated. By this interlock it is impossible to move the reverser lever accidentally when the bus is in motion, for in this position the controller pedal locks the reverser control rod, so that the same cannot be moved in any direction unless the controller foot pedal is brought to off position.

These and various other objects will be apparent from the following description and claims when taken in connection with the accompanying drawings wherein:

Figure 1 is a plan view of the base frame of the body of my improved vehicle showing the running gear and operating mechanism and the cabinets for the electrical apparatus mounted thereon.

Figure 2 is a side elevation of the vehicle with a part of the body shown.

Figure 3 is an enlarged view showing the interlock between the speed controller and reverser rods.

Figure 4 is a broken section on line 4—4 of Figure 1.

Figure 5 is a part sectional and part diagrammatic view of the electrical cabinets and electrical apparatus.

Figure 6 is an enlarged detail showing the cushioned and insulating mounting of the drive motors.

The electrically driven vehicle of this invention comprises a passenger-carrying body, the base frame of which is utilized to support the motor, the running gears, and other necessary parts of the vehicle. The heavy chassis frame members of the type heretofore generally used in road vehicles, and the heavy trucks such as commonly used in electrically driven rail cars being eliminated. The base frame is preferably disposed relatively close to the axles that are separately and independently connected thereto by means of springs in a well known manner.

This arrangement provides a vehicle having a very low floor line. The base frame of the body may be constructed of relatively light transverse longitudinally extending frame members, arranged in any suitable manner rigidly secured together so as to provide a convenient arrangement for supporting the running gear, the motors and necessary auxiliary equipment.

Preferably the base frame includes a pair of centrally disposed members 10 and 11 arranged in parallelism throughout the major portion of their length but diverging outwardly between the ends as indicated at 12. The ends 13 of said members may again be disposed in parallelism. Said members 10 and 11 extend continuously from end to end of the body and are rigidly connected together along their lengths by parallel transverse members 15 of channel or other suitable form.

Further longitudinal frame members 23 and 24 preferably disposed in the plane of the sides of the body are rigidly connected to the transverse members just referred to by means of brackets or other suitable means. Said frame members 23 and 24 form the longitudinal lower edges of the body of the vehicle. Member 24 is preferably bent to form the lower corners of the front and rear ends of the vehicle as indicated at 26 and 27. Members 26 and 27 are rigidly secured in any suitable manner to the ends of the centrally disposed members 10 and 11. At the door openings for the vehicle the longitudinal member 23 is interrupted and suitable additional frame members 28 and 29 are attached to the frame member 23 and transverse members 15 and serve to stiffen the base frame at these points. It will be noted that the frame members 28 and 29 are set into the side of the vehicle to provide space for the doors when open, so that the doors do not project beyond the side of the bus.

The frame so far described constitutes the base frame of the passenger carrying body of the vehicle. In order that the base frame described may be brought relatively close to the axles the frame members 23 and 24 curve upwardly over the wheels as indicated at 34. These curved members 34 serve to support the wheel housings that project within the space above the passenger carrying body.

The body of the vehicle is preferably supported upon drop axles, that is, axles in which the mid-portions thereof are disposed below the axes of rotation of the wheels. The forward end of the body is supported upon an axle 35 of this type which is sustained by wheels 36 and 37 attached to axle 35 so that they may be dirigible in a well known manner. The dirigible wheels are connected together for simultaneous steering movement by a link 38. As indicated in Figure 2 the axle 35 is connected to the base frame in a resilient manner by means of springs 39 and 40 securing the ends to the base frame in any desirable manner. The rear end of the body is supported on a dead axle 41 attached at its ends to housings 42 and 43, for the driving gears of the rear wheels 44 and 45. Preferably the driving mechanism for the wheels 44 and 45 will be as shown in Patent #1,773,979 though other equivalent arrangements may be used.

As illustrated in said patent, the live axle section, to which the wheels are rigidly secured, carry worms that are driven by an underslung worm arranged within the housings 42 and 43. Each of the driving worms for the rear wheels is separately driven by a propeller shaft 46 including the usual universal and split joint, resulting in a flexible propeller shaft that permits the wheels and housings carried thereby to move freely as the springs of the vehicle flex. The axle 41 is secured to the base frame of the body of the vehicle by springs 47, 48 that are attached at their ends to any of the transverse or longitudinally extending members of the frame. These springs are attached to the body or drop portion of the axle, that is, the axle which interconnects the housings 42 and 43, whereby the floor supported on the base frame is brought relatively close to the axis of the rotation of wheels 44 and 45. Preferably a separate motor is provided for driving each rear wheel. As illustrated in Figures 1 and 2, two main motors 49 and 50 are employed to drive the shafts 46 connected to the wheels 44 and 45. It will be understood that additional main motors may be provided to drive the forward wheels by universal joints in a manner well understood in the art.

Preferably the motors 49 and 50 are secured in a frame consisting of two transverse channel members 15 connected together by short longitudinally extending members 121 and 122 (Figure 1). In order to secure the motors in position they are provided with laterally extending lugs or brackets 124 by which they are secured to the transverse panel members 15 as seen in Figure 6. The lugs 124 are positioned beneath the channel members 15 and the motors are bolted thereto by bolts 125 passing through the channel members and the lugs, the motors being retained in position by nuts 126 so that the motors may be readily removed by simply removing the nuts that hold them in suspended relation to the frame of the body.

In order to dampen the vibrations of the motor and to provide a cushioning and insulating support therefor, the bolts 125 bear against metallic plates 127 which rest upon soft rubber cushions 128 disposed in the channel members 15. If desirable the nuts 126 and bolts 125 may be insulated from the brackets 124, such as by a fibre or hard rubber tube surrounding the bolts, and insulating washers such as hard fibre or rubber positioned between the nuts and the brackets. The weight of the motor is thus transmitted through plates 127 to the soft rubber cushions 128, which also function to effectively insulate the motor from the frame of the vehicle. In order to prevent excessive up and down movement of the motor, the lugs or brackets 124 are separated from the transverse frame members 15 by harder rubber composition blocks 129 preferably made of a substance known to the trade as "thermoid." These blocks also serve to prevent metal to metal contact of the parts. This arrangement of attaching the motor to the chassis of the vehicle not only permits ready removal of the motor but effectively prevents the transmission of vibration to the body and also effectively insulates the motors from the metal chassis and the body.

The motor for air compressor 59 may be similarly mounted to dampen vibrations thereof and insulate the same.

The motors 49 and 50 may be provided with braking mechanisms applied to the drive shaft, and disposed within housings 51 and 52. The braking mechanism for the motors are interconnected to cross-shaft 53 which is operated from the driver's position by link 54 in any approved manner. Preferably the brakes within the housings 51 and 52 are used for emergency and parking purposes only, the service braking of the vehicle being dependent upon cylinders 55, 56, 57 and 58 individual to the wheels and arranged to operate braking mechanism of any approved form. Such cylinders are operated to apply the brake by air or other fluid from a compressor 59 connected to the fluid compressor conduit 61.

The elements just referred to are all suitably attached to the transverse members so that the weight is balanced with respect to the base frame of the body. The flow of fluid through the brake cylinders individual to the wheels is controlled by a valve 63, operated by a link 64 extending to the driver's position for operation by him in any approved manner. A supply of fluid such as air under pressure is stored in tanks 69 for use in the fluid braking system, said tanks being conveniently suspended from the base frame of the body.

As seen from Figure 1, the parts are so arranged that a compartment is provided at the rear of the bus between the parallel portion 13 of the frame members and beneath the floor level of the bus. Preferably this compartment is used to carry spare tires which may be slipped out of a door through the rear of the body, and are supported on the auxiliary frame members shown in Figure 1.

Motors 49 and 50 derive their energy from a power plant supplying current under high tension through overhead wires from which the motor vehicles are supplied through trolleys. Inasmuch as the wheels 36 and 37, 44 and 45 are road wheels, preferably provided with pneumatic tires, it is necessary to provide a return wire or rail. Preferably a ground wire arranged parallel to the high tension wire is provided and a second trolley connects the said vehicle to the ground wire to complete the electrical circuit. It will be noted that the weight of the parts as thus described is balanced with regard to the vehicle chassis. The motors 49 and 50 are spaced equidistant from the longitudinal center of the vehicle and are furthermore positioned between the front and rear axles. The electrical controllers and other accessories are also arranged on the vehicle in such manner as to carry out the balance of weight with regard to both the longitudinal and transverse center lines of the vehicle.

As seen in Figure 1, electrical equipment cabinets 61 and 62 are provided on opposite sides of the vehicle just forward of the electrical motors 49 and 50. These cabinets are supported from the side frame members 23 and 24 and also from auxiliary longitudinal frame members 63 and 64 which are connected to the cross members 15 attached to the main frame members 10 and 11. Preferably cabinets 61 and 62 are insulated from the frame members upon which they are mounted by flexible insulating blocks such as rubber which absorbs road shocks which might injure the electric control units.

The two cabinets 61 and 62 contain all of the electrical control equipment, this equipment being thus grouped for convenient access and requiring very short electrical leads inter-connecting the various parts. The cabinet 61 contains the main controller 65 for the motors which is preferably controlled by the foot of the driver of the vehicle, and cabinet 62 contains the reverser controller 66. The main controller 65 and reverser controller 66 are actuated by shafts 67 which project therefrom and are connected to insulating sections 68 within the boxes. The sections 68 are then connected to shafts 71 and 72 for the main controller and reverser controller respectively. Shafts 71 and 72 project into a bearing 70 (Figure 4) secured to frame member 10 for supporting the free ends of the shafts. Shaft 71 is provided with an actuating lever 73, and shaft 72 with a similar lever 74, as seen in Figure 4, and these levers are connected to the rods 75 and 76 which extend forwardly to the driver's seat of the vehicle for actuation by the driver. Actuation of the rod 75 by the driver causes rotation of the shaft 71 and the shaft 67 of the main controller 65 to vary the speed of both the motors 49 and 50 which are connected directly to the driving wheels by drive shaft 46. Actuation of the rod 76 causes rotation of shaft 72 which will reverse the position of the reverser controller 66 to reverse the rotation of motors 49 and 50, in accordance with whether the bus is being driven forward or in a reverse direction.

The main controller 65 is controlled by a foot pedal 78 which when depressed moves the rod 75 forwardly to speed up the motors. The depression of the foot pedal 78, in accordance with the speed desired, is similar to the foot accelerator control for a gasoline driven vehicle. Furthermore, the forward and reverse movements of the vehicle of the present invention are controlled by an upwardly extending hand operated lever 81 which is similar to the gear shift lever for a gasoline propelled vehicle. However, this lever 81 has two positions only; when the vehicle is to be driven in a forward direction the lever 81 is moved forwardly by the driver toward the front of the vehicle, and when the vehicle is to be driven backward, the lever 81 is pulled towards the rear of the vehicle. The neutral position for lever 81 is midway between these two extremes or in the upright position shown in Figure 2.

It is essential that the reverser controller 66 be operated only when the main controller 65 is in the off position. This invention includes a novel interlocking mechanism shown in detail in Figure 3 for preventing movement of the reverser controller rod 76 except when the main controller is in the off position. The main controller rod 75 has a cam member 82 thereon which cooperates with the upper end of a plunger 83 normally biased upwardly by spring 84 and having a fork member 85 on the lower end thereof. The reverser controller rod 76 has a pin 86 thereon for cooperation with the fork 85. The pin 86 is positioned as shown in full lines in Figure 3 when the reverser lever 81 is in neutral position. If in this position the foot controller pedal 78 is depressed the cam 82 moves to the right of Figure 3 forcing the fork member 85 downwardly to the dotted line position, thus locking the pin 86 and the reverser rod 76 in neutral position. In order to drive the vehicle therefore, the foot lever must be brought back to off position. Then the reverser rod 81 can be moved either forwardly or backwardly to drive the vehicle either in a forward or reverse direction. If the vehicle is to be driven forward the pin 86 moves to the position marked 86b of Figure 3 and the pin is thus clear of the fork 85. When the foot pedal 78 is depressed the fork 85 is also depressed by cam 82 and the pin 86 cannot return to the position shown in full lines in Figure 3 since the side of the fork will block such movement. If the vehicle is to be driven backward, the pin 86 moves to the position 86a and a similar interlock takes place when the foot pedal 78 is depressed.

Thus the driver of the vehicle must always bring the main controller 65 to off position before the reverser rod 81 may be manipulated. Furthermore the rod 81 cannot be inadvertently knocked or moved out of position by passengers when the foot lever 78 is depressed and the main controller 65 is on.

The cabinet 61 furthermore contains a sequence switch 91, and a line switch or circuit breaker 92 and other auxiliary electrical control equipment not shown in detail such as switches, fuse blocks, control switches for the compressor motor, and the like. The cabinet 62 contains the switching group 93 upon which is mounted the various electrical contacts leading to the tube resistors 95 mounted midway of the vehicle between the cabinets.

Each of the cabinets 61 and 62 is lined with asbestos lining 94 or other similar heat insulating material, and the electrical apparatus is mounted therein upon wooden blocks or fiber boards. The wood blocks have been found to amply insulate the electrical units since no moisture can enter the cabinets, and separate shields or boxes are not necessary.

As seen in Figure 2, each cabinet 61 and 62 is positioned beneath the floor line of the vehicle and has an opening through the side of the bus body extending the full length of the cabinet and adapted to be closed by a door 97. The doors 97 are also lined with heat insulating material such as asbestos or the like and are provided adjacent their rims with a sponge rubber seal 98, which engages against the corresponding portion of the cabinet when the door is closed. Each door is pivoted on hinges about the lower edge and lengthwise of the trolley bus, whereby the door may swing outwardly and downwardly as seen in Figure 4. The doors are retained closed by refrigerator-type latches 101, which maintain the sponge rubber seal 98 under compression at all times, and effectively prevent entrance of moisture from the atmosphere into the cabinet. Thus the cabinets are kept dry at all times and the combination of the asbestos lining with the wooden or fiber blocks on which the electrical apparatus is mounted effectively prevents electrical leakage and short circuits. When the doors 97 are open, all of the electrical units contained within the cabinet are readily accessible for adjustment and repair.

From Figure 5 it will be apparent that the electric wiring is compactly grouped in the cabinet, and the amount of wiring exposed to the weather beneath the chassis of the vehicle is a minimum. The motors 49 and 50 are connected by a cable 103 to the cabinet 62, and since the motors are closely adjacent to the ends of the cabinet, this cable is very short. All of the wiring between cabinets 61 and 62 is grouped in a cable 104, and this cable is connected by cable 105 and wires 106 to the main or foot controller 65. Furthermore, cable 104 is connected by cable 107 and wires 108 to the sequence switch 91. The high tension wires 111 and 112 are connected to overhead or underground trolleys in any approved manner and enter the boxes 61 and 62 and are connected to the proper switches, the wire 111 being connected to the line or disconnecting switch 92.

By this construction it will be apparent that all of the electrical units are housed within heat-insulated and moisture-proof cabins, and the electrical leads between units are greatly shortened and are not exposed to the weather conditions beneath the chassis of the vehicle. A saving in weight and cost is accomplished by greatly reducing the amount of wiring previously necessary in trolley busses wherein electrical units are scattered in various convenient locations on the vehicle body. A further saving is effected in the cost of the electrical equipment by the elimination of individual sheet metal or other containers for the electrical units, and by the use of inexpensive wooden or fiber blocks for mounting the electrical apparatus. It has been found that this mounting does not reduce the insulation between the electrical units when they are all housed in the moisture-proof cabinets. By the arrangement of wiring as shown, it is possible to reduce the total wiring that has been used on previous standard trolley busses by approximately 50%. The present arrangement furthermore reduces the wiring exposed to the weather beneath the chassis of the bus by approximately 80%, since only one large cable need be extended from one side cabinet to the other, and relatively few cables extend from the side cabinets to the resistors, the motors and other apparatus located outside of the cabinets. It is unnecessary to cover the wires inside of the cabinet with protective loom and therefore a neat and compact assembly of wiring is possible, thereby adding to the appearance and the accessibility of the apparatus and the wiring thereof. The few cables that need be run outside of the side cabinets are covered with suitable weatherproof loom.

All cables and wires entering the cabinets 61 and 62 are sealed through the openings to effectively prevent entrance of moisture to the cabinets, such as by plastic sealing compounds around the wires. All terminal ends on wiring outside of the weather-proof cabinets will be left bare of protective loom to minimize the electrical creepage. This electrical creepage is reduced to a minimum with the present arrangement, and therefore it is easy to localize the source of such trouble and correct the same. All exposed cables are supported from wooden blocks, the use of metal clips being avoided, at no points of support will the cables come in contact with the metal parts of the body, thus eliminating a serious source of short circuiting. By this arrangement of parts it is possible to reduce the weight of a standard trolley bus by approximately 500 pounds, and to reduce the labor costs in constructing the vehicle by approximately $500.00.

A further advantage of the novel arrangement of the electrical control units in the cabinets as herein disclosed lies in the ready assembly of the apparatus. In initially building the bus, the cabinets 61 and 62 may have the various electrical units permanently mounted therein upon the wooden blocks prior to the installation of the cabinets on the chassis of the bus. In this manner the parts may be readily and permanently mounted in their proper location in the cabinet, and furthermore the interior wiring within the cabinets may be done before the cabinets are installed in the bus. After the parts have been thus mounted in the cabinets the units may be tested and then the cabinets may be secured to the frame members of the bus chassis on fiber or wooden blocks to effectively insulate the cabinets from the vehicle and the cables may then be connected to the parts to be controlled by the electrical units within the cabinets. A material saving in labor costs is thus possible by the assembly of the units in the cabinet as above described.

Further protection for the passengers is provided in the insulation at the front and rear doors positioned at auxiliary frame members 28 and 29. These auxiliary frames and the stepwells are covered with heavy rubber insulation, and the stanchions reached by passengers standing on the grounds are insulated from the bus body by fiber connections.

A further advantageous feature resides in the fact that the busses are sold to various operating companies scattered throughout the country, and therefore the electrical control units should be placed in the most readily accessible position for periodic testing and repairs by the usual mechanics and bus drivers. By grouping the units as shown in this application, a mechanic may readily open the side cabinet doors 97 and have ready access to all of the electrical units which need to be tested and adjusted at periodic intervals. If emergency repairs or adjustments are necessary while the vehicle is in use, such repairs may be easily done by the bus operator or a skilled mechanic without disturbing the passengers seated in the vehicle.

Furthermore, the initial tests and adjustments necessary after the parts have been installed in the vehicle are greatly facilitated, since all of the units are compactly located and any wiring or electrical faults may be readily located and corrected.

All of the above desirable results are obtained in addition to the added safety features of housing all the high tension electrical equipment in one cabinet which is fire-proof and tightly sealed closed so that the fire hazard is practically eliminated and the danger of electrical charges to the body of the vehicle is greatly reduced. Therefore, the electrically operated parts of the bus such as the driving motors, air compressor motor, door and fare register operating mechanism, lights, and other parts of the bus may all be operated by the high-tension current as received over the trolleys, thus greatly simplifying the wiring and necessary auxiliary apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. An electrically driven motor vehicle of the type that derives its energy from a remote power station comprising a body, axles, road wheels sustaining each axle, a plurality of electric motors each directly connected to a wheel to drive the same, a pair of high tension wires adapted to receive electric energy from means in communication with the remote power source, electric control means comprising an electric controller for governing the speed of the motors, a moisture-proof cabinet, closely adjacent one of said motors, said high tension wires entering said cabinet, and said electric controller being housed therein and connected by wires within said cabinet, and wires extending out of said cabinet directly to said motors, a shaft projecting from said cabinet for operating said controller, and a rod connected to said shaft and adapted to be manually operated by the vehicle operator.

2. An electrically driven road vehicle of the type that derives its energy from a remote power station comprising a body, axles, road wheels sustaining each axle, a plurality of electric motors each directly connected to a wheel to drive the same, a pair of high tension wires adapted to receive electric energy from means in communication with the remote source, electric control means comprising a reverser controller for determining the direction of rotation of said motors, a moisture-proof cabinet closely adjacent one of said motors, said high tension wires entering said cabinet, and said reverser controller being housed therein and connected by wires within said cabinet, and wires extending out of said cabinet directly to said motors, a shaft projecting from said cabinet for operating said reverser controller, and a rod connected to said shaft and adapted to be manually operated by the operator of said vehicle.

3. An electrically driven road vehicle of the type that derives its energy from a remote power station comprising a body, axles, road wheels sustaining each axle, a plurality of electric motors directly connected to a wheel to drive the same, a pair of high tension wires adapted to receive electric energy from means in communication with the remote power source, an electric controller for governing the speed of said motors, and a reverser controller for determining the direction of rotation of said motors, two moisture-proof cabinets on opposite sides of the vehicle and closely adjacent said motors, said high tension wires entering said cabinets, said electric controller for governing the speed of said motors and said reverser controller each being housed in one of said cabinets and connected by wires therein, and wires extending out of said cabinets directly to said motors, means for manually operating said controllers, and interlocking mechanism preventing operation of said reverser controller except when said speed controller is in off position.

4. An electrically driven road vehicle of the type that derives its energy from a remote power plant comprising a body, axles, road wheels sustaining each axle, an electric motor for driving the vehicle, high tension wires adapted to receive electric energy from means in communication with the remote power plant, a reverser controller for governing the direction of rotation of said motor, a speed controller to govern the speed of said motor, an upwardly extending handle for operating said reverser controller, said controller being positioned to cause said motor to drive the vehicle forward when said handle is moved in one direction out of its vertical axis, and to cause said motor to drive the vehicle backward when the handle is moved in the opposite direction out of its vertical axis, a foot operated pedal for operating said speed controller, said controller causing an increase of speed of the motor as the foot pedal is depressed, and an interlock mechanism preventing movement of the said reverser controller handle when said foot pedal is depressed.

5. An electrically driven road vehicle of the type that derives its energy from a remote power station comprising a body, axles, road wheels sustaining each axle, an electric motor for driving the vehicle, a pair of high tension wires adapted to receive electric energy from means in communication with the remote power station, a plurality of electrical control units for controlling the supply of electric energy from said wires to said motor, two moisture proof cabinets on opposite sides of the vehicle and closely adjacent said motor, said high tension wires entering said cabinets, and all of said electric control units housed therein and connected by wires within said cabinets, and wires extending out of said cabinets to said motor, and means comprising a shaft projecting from each of said cabinets for operating said controller therein, and a rod connected to each shaft adapted to be manually operated by the vehicle operator.

6. An electrically driven road vehicle of the type that derives its energy from a remote power plant comprising a body, axles, road wheels sustaining each axle, an electric motor for driving the vehicle, high tension wires adapted to receive electrical energy from means in communication with the remote power station, a reverser controller for governing the direction of rotation of said motor, a speed controller for governing the speed of said motor, manually operable means for operating said reverser controller, manually operable means for operating said speed controller, and an interlock mechanism for preventing movement of said reverser controller when said manually operable means for said speed controller is operated.

7. An electrically driven vehicle of the type that derives its energy from a remote power station comprising a body, axles, road wheels sustaining each axle, an electric motor for driving the vehicle, a pair of high tension wires adapted to receive electric energy from means in communication with the remote power source, an electric controller for governing the speed of said motor, and a reverser controller for determining the direction of rotation of said motor, two cabinets adjacent said motor, said high tension wires entering said cabinets, said electric controller for governing the speed of said motor and said reverser controller each being housed in one of said cabinets and connected by wires therein, wires extending out of said cabinets directly to said motor and means comprising a shaft projecting from each of said cabinets for operating said controller therein, and a rod connected to each shaft to be manually operated by the vehicle operator.

8. An electrically driven road vehicle of the type that derives its energy from a remote power station comprising a body, axles, road wheels sustaining each axle, an electric motor for driving the vehicle, electrical circuit connections comprising high tension conductors adapted for suitable connection to the remote power plant, an electric control unit for controlling the supply of electric energy from said conductors to said motor, a cabinet housing said electric control unit, said high tension conductors entering said cabinet, and electrical conductors extending out of said cabinet directly to said motor, a shaft projecting from said cabinet for operating said control unit, and a rod connected to said shaft and adapted to be manually operated by the operator of the vehicle.

WILLIAM B. FAGEOL.